United States Patent [19]

Aron

[11] 3,787,341
[45] Jan. 22, 1974

[54] NOVEL PROCESSING AIDS FOR NATURAL AND SYNTHETIC RUBBER COMPOUNDS

[75] Inventor: Erwin Aron, Clifton, N.J.

[73] Assignee: Technical Processing, Inc., Paterson, N.J.

[22] Filed: June 12, 1972

[21] Appl. No.: 263,752

[52] U.S. Cl. ............ 260/23.7 M, 252/40, 252/52 R, 260/31.4 R, 260/33.4 R, 260/33.6 AB, 260/752
[51] Int. Cl. ............................................. C08d 7/18
[58] Field of Search.... 260/752, 23.7 M, 31.4, 33.4, 260/33.6, 38.2, 38.4; 252/40, 52

[56] References Cited
UNITED STATES PATENTS

| | | | |
|---|---|---|---|
| 3,350,346 | 10/1967 | Maxson | 260/45.75 |
| 2,904,522 | 9/1959 | Catlin | 260/45.75 R |
| 3,067,151 | 12/1962 | Terry | 260/45.75 R |
| 3,437,621 | 4/1969 | Aron | 260/23.7 |

OTHER PUBLICATIONS

Chatfield "Varnish Constituents" 1953, (130 & 131)

Primary Examiner—Donald E. Czaja
Assistant Examiner—William E. Parker
Attorney, Agent, or Firm—Edward W. Greason et al.

[57] ABSTRACT

This invention is directed to novel compositions which aid in the processing of natural and synthetic rubber by permitting the usual peptizing step of such processing to be omitted. These compositions contain salts of aromatic sulfonic acids as well as long chain (fatty) acids as essential ingredients.

10 Claims, No Drawings

NOVEL PROCESSING AIDS FOR NATURAL AND SYNTHETIC RUBBER COMPOUNDS

BACKGROUND OF THE INVENTION

Crude natural rubber is generally quite high in viscosity and therefore does not mix easily and quickly with the many additives used during processing. To facilitate these additions, such rubber usually is softened by undergoing a preliminary step called mastication.

The rubber is placed into a usual mixer, such as the Banbury, and is subjected to heat and a plasticizer (peptizer), while being mixed, for several minutes. It is then dumped, sheeted on a roll mill and cooled. The softened rubber then undergoes the mixing step.

The use of the novel processing aids of this invention eliminate the need for the mastication step. These compositions can be added directly to the crude rubber in the mixing cycle along with the other additives. It is, therefore, an object of this invention to provide novel rubber processing compositions which will facilitate the breaking of the polymer and thereby eliminate the need for both the mastication step and the peptizers used therein.

The novel processing compositions of this invention have other beneficial effects in rubber compounding. They reduce the mixing time required for the rubber compounding and provide for better dispersal of additives than traditional methods. In addition, they lower mixing temperatures and provide for improved flow, improved physical properties, improved mixing and extruding characteristics, and improved physical characteristics of the rubber. Hence, even the compounding of synthetic rubber requiring no premastication will be enhanced by the use of these formulations.

It is, therefore, a further object of this invention to provide novel rubber processing compositions which facilitate the mixing of rubber compounds with natural and synthetic rubbers in relation to time requirements, arrangement of schedule for the addition of various compounding ingredients, and the possibility of uninterrupted working with the mixed compound because of lower, safer dump temperatures without adversely affecting physical properties of said rubber compounds.

SUMMARY OF THE INVENTION

This invention relates to novel processing aids for rubber compounding, and in particular it relates to novel compositions which eliminate the need for a separate mastication operation and provide for improving the mixing time, improving the dispersal of additives and lowering of mixing temperatures when compounding rubber.

The novel compositions of this invention allow the mastication and mixing steps to be combined into one continuous operation because the mixing time is shorter and temperatures are lower. Physical properties of the rubber compound are improved as the dispersion of additives is improved providing for greater uniformity in the rubber product.

The essential components of the compositions of this invention are homogeneous mixtures of, 1. alkali salts of aromatic sulfonic acids; the general formula for such sulfonic acids being

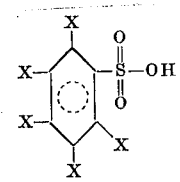

wherein X can be either hydrogen or a branched or straight chain alkyl group having from 4 to 14 carbon atoms, the preferable alkyl group having a chain length of about 8 to 12 carbon atoms such as potassium octylbenzene sulfonate, potassium n-dodecyebenzene sulfonate and mixtures thereof; and 2. long chain fatty acids having a maximum of about 22 carbon atoms in the chain, such as, but not limited to, stearic acid, palmitic acid, oleic acid and mixtures of such acids. The fatty acids should be present in amounts at least about equal to the amount of sulfonates but may be present in substantial excess if desired.

The above essential components usually are mixed with suitable materials to facilitate introduction into the polymer. Such materials include esters and ethers of aromatic alcohols, acids, etc. These additional materials are preferably similar to the materials comprising the composition of the invention of my copending Application, Ser. No. 128,549, of Mar. 26, 1971. These generally are aromatic esters, compounds with alcoholic and glycolic hydroxyl groups, potassium or sodium soaps of fats or fatty acids, metal soap of zinc, magnesium, calcium or barium, and a paraffin. Specifically, these additional materials may comprise a. From about 5 percent to about 15 percent of aromatic esters selected from groups consisting of (1) diaryl- and di-alkylaryl phthalates, (2) diaryl- and alkyl-aryl mono-glycolether phthalates, (3) phthalates from polyglycol mono-ethers of aryl and alkyl-aryl compounds wherein the polyglycol chain contains from 2 to 6 ethylene oxide groups in the chain, (4) di-benzoates of glycol and propyleneglycol, and their di- and tri-mers; and (5) mixtures of the above.

b. From about 5 percent to about 30 percent of compounds with alcoholic or glycolic hydroxyl groups selected from (1) straight or branched chain aliphatic alcohols having from about 8 to 20 carbons in the chain, (2) alkyl-phenoxy ethers of glycols or polyglycols wherein the alkyl group is limited to about 12 carbons in the chain, and the polyglycol grouping does not contain more than about 6 ($CH_2$ —$CH_2$ —O—) groups, (3) polypropylene glycol of about three propylene oxide groups in the molecule, and (4) mixtures of the above.

c. From about 5 percent to about 15 percent of potassium or sodium soaps made from commerical mixtures of fats or fatty acids containing from about 12 to about 18 carbon atoms in the chain, said chains having only a small degree of unsaturation, with more than 50 percent of them having 18 carbon atoms in the chain.

d. From about 10 percent to about 30 percent of fatty acids having from about 12 to about 18 carbon atoms in the chain, said chains have only a small degree of unsaturation, with more than 50 percent of them having 18 carbon atoms in the chain.

e. From about 5 percent to about 10 percent of a metal soap where the metal is selected from the group consisting of zinc, magnesium, calcium, or barium; and the fatty acid part of the soap has from about 12 to 18 carbon atoms in the chain and contains a high percentage of chains with a single double bond in the chain.

f. From about 15 percent to about 60 percent of hydrocarbons selected from the group consisting of mineral oil, mineral waxes, and petrolatum, or mixtures of them.

Preferably the potassium or sodium soaps of (c) above or the fatty acids of (d) above are compounds which have iodine values in the range of about 5 to about 15. The metal soaps of (e) above are more unsaturated and have iodine values in the range of about 80 to about 95.

Typical aromatic esters of (a) above which may be used in the compositions of this invention are Dibenzylphthalate Diphenylphthalate, Di-(2-Phenoxyethyl) Phthalate; Di-(Nonyl-phenoxyethyl) Phthalate, Di-(Nonylphenoxytetraethyleneglycol) Phthalate; Benzyldodecylphenoxyhexaethyleneglycol Phthalate; Di-Octylphenoxyhexaethyleneglycol Phthalate; Diethyleneglycol Dibenzoate, Dipropyleneglycol Dibenzoate, Triethyleneglycol Dibenzoate.

Illustrative of the compounds with alcoholic or glycolic hydroxyl groups referred to in (b) above which may be employed are 2-Ethylhexanol, Cetyl Alcohol, Stearyl Alcohol, Nonylphenoxyglycol, Nonylphenoxydiglycol, Nonylphenoxytetraethyleneglycol, Dodecylhexaethyleneglycol, Dipropyleneglycol, Tripropyleneglycol.

Among the potassium or sodium soaps referred to in (c) above are sodium and potassium soaps of hydrogenated tallow, hydrogenated oils of vegetable or marine origin, and soaps of potassium or sodium made with fractions prepared from oils and fats, such fractions having iodine values from about 5 to about 15.

Typical fatty acids which may be employed are those derived from hydrogenated tallow, hydrogenated oils of vegetable or marine origin.

Illustrative of the fatty acids part of the metal soaps referred to in (e) above are oils of vegetable origin or fractions of animal fatty acids such as red oil.

Among the petroleum jellies, mineral oils, and mineral waxes, which may be employed in the compositions of this invention, are waxes having melting points of about 120° to 170° F.

However, compositions of this invention are not limited to the above additional materials and any similar chemicals will suffice. All ingredients may be of technical grade and may contain varying amounts of related materials, by-products, etc. The novel rubber processing aids of this invention can be made by melting the ingredients together, mixing and cooling, forming a waxy solid. The additional materials may be added together with the sulfonic acid and fatty acid and all components heated until a clear melt is obtained. The alkali soaps and soaps of the bivalent metals can also be made in situ as is well known in the art, from the oxide, hydroxide or carbonate of the metal and the desired acids or acid anhydrides followed by the evaporation or boiling off of the resulting water.

A preferred formulation for balance processing aids of this invention contains the following approximate percentages by weight of compounds which are typical of their class:

3 percent to 15 percent alkali salt of aromatic sulfonic acid
5 percent to 25 percent fatty acid
7 percent to 15 percent diphenylphthalate
10 percent to 20 percent Tetraethyleneglycol mono-nonylphenolether
5 percent to 10 percent Tripropyleneglycol
5 percent to 20 percent Potassium stearate
4 percent to 10 percent Zinc Oleate
0 percent to 5 percent Cetyl alcohol
15 percent to 40 percent Petrolatum The compositions of this invention are generally added to the rubber at the beginning of the mixing cycle. The usual additives, such as pigments, fillers, vulcanizing agents, etc., can then be added and the entire compounding performed in one operation.

The processing aids of this invention are employed in small, but effective amounts. It is generally added in the range of about 1 percent to about 5 percent and preferably in the range of about 2 percent to about 4 percent, based on the total weight of the rubber material. They may be added to any type rubber, whether it is of a natural, synthetic or reclaimed type.

The following typical compounds and examples describe this invention and its application.

COMPOUND A 10.0 Parts Potassium n-dodecylbenzenesulfonate, techn. (mixed isomers)
22.0 Parts Stearic acid, techn. rubber grade
10.0 Parts Diphenylphthalate, techn.
15.0 Parts Tetraethyleneglycol mono-nonylphenolether, techn.
5.0 Parts Tripropyleneglycol, techn.
18.0 Parts Potassium stearate, techn.
4.0 Parts Zinc oleate, techn.
2.0 Parts Cetyl alcohol, techn.
14.0 Parts Petrolatum, N.F.

The above ingredients, were melted together and thoroughly mixed, to form a waxy solid.

COMPOUND B 3.0 Parts Potassium octylbenzenesulfate, techn. (mixed isomers)
11.0 Parts Stearic acid, techn., rubber grade
9.5 Parts Diphenylphthalate, techn.
16.0 Parts Tetraethyleneglycol mono-nonylphenolether, techn.
6.5 Parts Tripropyleneglycol, techn.
8.0 Parts Potassium stearate, techn.
9.0 Parts Zinc oleate, techn.
37.0 Parts Petrolatum, N.F.

The above ingredients were melted together and mixed thoroughly to yield a soft waxy material.

COMPOUND C 3.0 Parts Potassium n-dodecylbenzenesulfonate, techn. (mixed isomers)
11.0 Parts Stearic acid, techn., rubber grade
9.5 Parts Diphenylphthalate, techn.
16.0 Parts Tetraethyleneglycol mono-nonylphenolether, techn.
6.5 Parts Tripropylene glycol, techn.
8.0 Parts Potassium stearate, techn.
9.0 Parts Zinc oleate, techn.
37.0 Parts Petrolatum, N.F.

The above ingredients were melted together and thoroughly mixed to yield a soft waxy material.

All of the above formulations, made in accordance with this invention, were used as additives at about a 4 percent level in various natural and synthetic rubber formulations. Results of these tests are set forth below.

EXAMPLE NO. 1
(NATURAL RUBBER COMPOSITION)

100.00 Parts Ribbed smoked sheet No. 4
0.33 Parts Di-o-benzamidophenyl disulfide
4.00 Parts Mixture of high molecular weight sulfonic acid and mineral oils sold under tradename K-Stay G by the Vanderbilt Co.
55.00 Parts Carbon black ISAF
8.00 Parts Pine tar
5.00 Parts Zinc oxide
2.50 Parts Stearic acid, rubber grade
1.00 Parts diphenylamine-acetone reaction product sold under tradename Agerite superflex by the Vanderbilt Co.
1.00 Parts Mixture of aromatic amines sold under the tradename Agerite hypar by the Vanderbilt Co.
0.65 Parts N-oxydiethylene benzothiazole -2- sulfenamide
0.65 Parts N-nitrosodiphenylamine
2.50 Parts Insoluble sulfur The optimum processing for the natural rubber compositions of Example No. 1, as established by actual production runs, involved three separate mixing cycles:

PEPTIZING-MASTICATION CYCLE

1. The ribbed smoked sheet and di-o-benzamidophenyl si-sulfide were mixed for 7 minutes in a Banbury mixer. The dump temperature was approximately 250° F. The rubber was then stored before further processing.

2. The peptized rubber was admixed with the other ingredients of the formula except the curatives and accelerators in a 13 minute Banbury cycle. The dump temperature was approximately 280° F., too high for inclusion of the accelerators, etc. The rubber was stored for cooling.

3. To this blend the curatives of the formula were added on an open mill. Three minutes of milling were required for proper dispersion.

The total time consumed by the processing, not considering handling and storage time, was about 23 minutes.

It was found that by omitting the peptizer in the formula of Example No. 1 and introducing about 4 parts of the compositions of this invention into the formula, mixing could be performed in much less time and in a single mix cycle. This afforded great savings in handling and storing the material. These findings are shown in the following examples:

EXAMPLE NO. 2
(NATURAL RUBBER COMPOSITION)

100.00 Parts Ribbed smoke sheet No. 4
4.00 Parts Compound A of this invention
4.00 Parts Mixture of high molecular weight sulfonic acid and mineral oils sold under the tradename K-Stay G by the Vanderbilt Co.
55.00 Parts Carbon black ISAF
8.00 Parts Pine tar
5.00 Parts Zinc oxide
2.50 Parts Stearic acid, rubber grade
1.00 Parts Diphenylamine-acetone reaction product sold under tradename Agerite superflex by the Vanderbilt Co.
1.00 Parts Mixture of aromatic amines sold under the tradename Agerite hypar by the Vanderbilt Co.
0.65 Parts N-oxydiethylene benzothiazole -2- sulfenamide
0.65 Parts N-nitrosodiphenylamine
2.50 Parts Insoluble sulfur The above formula was mixed in a single Banbury mix cycle taking 8 minutes, dump temperature 240° F. The dispersion of ingredients was better than that obtained in the 3-cycle mixing of Example No. 1.

EXAMPLE NO. 3
(NATURAL RUBBER COMPOSITION)

100.00 Parts Ribbed smoked sheet No. 4
4.00 Parts Compound B of this invention
4.00 Parts Mixture of high molecular weight sulfonic acid and mineral oils sold under the tradename K-Stay G by the Vanderbilt Co.
55.00 Parts Carbon black ISAF
8.00 Parts Pine tar
5.00 Parts Zinc oxide
2.50 Parts Stearic acid, rubber grade
1.00 Parts Diphenylamine-acetone reaction product sold under tradename Agerite superflex by the Vanderbilt Co.
1.00 Parts Mixture of aromatic amines sold under tradename Agerite hypar by the Vanderbilt Co.
0.65 Parts N-oxydiethylene benzothiazole -2- sulfenamide
0.65 Parts N-nitrosodiphenylamine
2.50 Parts Insoluble sulfur The composition of Example No. 3 was mixed in a single pass. The time required was 10 minutes, dump temperature was 255° F.

Improvements in mixing of neoprene compounds with the aid of the compositions of this invention is illustrated by the following two examples:

EXAMPLE NO. 4
(NEOPRENE WHV COMPOSITION)

100.00 Parts Neoprene WHV
2.00 Parts Phenyl-octylphenylamine
4.00 Parts Magnesium oxide
5.00 Parts Zinc oxide
0.50 Parts Stearic acid
20.00 Parts Carbon black FEF
35.00 Parts Carbon black FT
20.00 Parts Calcium carbonate
0.50 Parts Trimethylthiourea Through a series of trial runs it had been established that a 12 minute Banbury mixing cycle was required for satisfactory dispersion of the fillers in the polymer. The dump temperature was approximately 265° F.

The above compares unfavorably with Example No. 5 containing Compound C of this invention.

EXAMPLE NO. 5
(NEOPRENE WHV COMPOSITION)

100.00 Parts Neoprene WHV
4.00 Parts Compound C of this invention
2.00 Parts Phenyl-octylphenylamine
4.00 Parts Magnesium oxide
5.00 Parts Zinc oxide 0.50 Parts Stearic acid
20.00 Parts Carbon black FEF
35.00 Parts Carbon black FT
20.00 Parts Calcium carbonate
0.50 Parts Trimethylthiourea After 8 minutes of mixing in a Banbury mixer, dispersion of fillers in this polymer were better than those achieved in a 12 minute run without Compound C. The dump temperature was 235° F.

Examples No. 6 and No. 7 show differences in processing a styrene-butadiene (SBR) stock with and without the compositions of this invention.

EXAMPLE NO. 6

(SBR, CARBON FILLED COMPOSITION)

100.00 Parts SBR 1500 rubber
2.00 Parts High molecular sulfonic acid - mineral oil mix sold under tradename Bondogen by the Vanderbilt Co.
5.00 Parts Zinc oxide
2.00 Parts Stearic acid, rubber grade
1.50 Parts Phenyl-octylphenylamine
50.00 Parts ISAF black
2.00 Parts Sulfur
1.50 Parts Benzothiazyldisulfide This composition was mixed in two cycles because high mixing temperatures did not allow the introduction of the curatives and accelerators. The practical method was to mix the SBR, bondogen, zinc oxide, stearic acid and the phenyl-octylphenylamine together with 25 parts of the ISAF black. This step took 8 minutes. Later, in a second mix cycle, the remainder of the ingredients was admixed. Time required was 5 minutes, dump temperature 240° F.

EXAMPLE NO. 7

(SBR, CARBON FILLED COMPOSITION)

100.00 Parts SBR 1500 rubber
3.00 Parts Compound A of this invention
2.00 Parts High molecular sulfonic acid - mineral oil mix sold under tradename Bondogen by the Vanderbilt Co.
5.00 Parts Zinc oxide
2.00 Parts Stearic acid, rubber grade
1.50 Parts Phenyl-octylphenylamine
50.00 Parts ISAF black
2.00 Parts Sulfur
1.50 Parts Benzothiazyldisulfide This was mixed in a single stage. The time required for complete dispersion of ingredients was 4-½ minutes against a total of 13 minutes for Example No. 6; the dump temperature was 220° F.

What is claimed is:

1. A composition of matter comprising:
   a. an alkali salt of an aromatic sulfonic acid having the formula

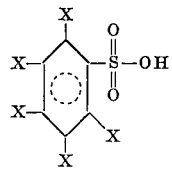

wherein x is hydrogen or a branched or straight chain alkyl group having from 4 to 14 carbon atoms; and
   b. a long chain fatty organic acid having a maximum of about 22 carbon atoms in the chain wherein the weight ratio of said fatty acid to said sulfonic acid is from 1:1 to 8.33:1.

2. A composition according to claim 1 wherein the long chain fatty organic acid is stearic acid.

3. A composition according to claim 1 wherein the alkyl substituents have between 8 and 12 carbons in the chain.

4. A composition according to claim 1 wherein the alkali salt of the aromatic sulfonic acid is selected from the group consisting of potassium octylbenzene sulfonate, potassium n-dodecylbenzene sulfonate and mixtures thereof.

5. A composition according to claim 1 to which is added additional materials including aromatic esters, compounds with alcoholic and glycolic hydroxyl groups, potassium or sodium soaps of fats or fatty acids, a fatty acid, a metal soap of zinc, magnesium, calcium or barium, and a paraffin.

6. A composition according to claim 5 comprising from about 3 percent to about 15 percent of the alkali salt of said aromatic sulfonic acid, about 5 percent to about 25 percent of said long chain fatty organic acid, about 7 percent to about 15 percent diphenylphthalate, about 10 percent to about 20 percent tetraethylene glycol mono-nonylphenolether, about 5 percent to about 10 percent tripropylene glycol, about 5 percent to about 20 percent potassium stearate, about 4 percent to about 10 percent zinc oleate, up to 5 percent cetyl alcohol, and about 15 percent to about 20 percent petrolatum.

7. An improved rubber composition comprising a rubber base, carbon black, rubber additives wherein the improvement comprises a small but effective amount of a composition comprising:
   a. the alkali salt of an aromatic sulfonic acid having the formula

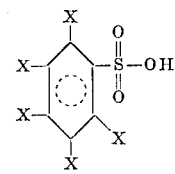

wherein x is hydrogen or a branched or straight chain alkyl group having from 4 to 14 carbon atoms, and
   b. a long chain fatty organic acid having a maximum of about 22 carbon atoms in the chain, wherein the weight ratio of said fatty acid to said sulfonic acid is from 1:1 to 8.33:1, and said amount being sufficient to eliminate the need for subse-quent separate mastication of said rubber composition.

8. A rubber composition according to claim 7 wherein said amount is between about 1 percent to about 5 percent by weight.

9. An improved method for compounding rubber comprising admixing rubber with an additive of the class consisting of pigments, fillers and vulcanizing agents, wherein the improvement comprises admixing a composition according to claim 1 with rubber at the beginning of the mixing cycle prior to mastication of the rubber and no later than the time when said rubber is admixed with said additive.

10. A method according to claim 9 wherein said composition comprises from about 3 percent to about 15 percent of the alkali salt of said aromatic sulfonic acid, about 5 percent to about 25 percent of said long chain (fatty) organic acid, about 7 percent to about 15 percent diphenylphthalate, about 10 percent to about 20 percent tetraethylene glycol mono-nonylphenolether, about 5 percent to about 10 percent tripropylene glycol, about 5 percent to about 20 percent potassium stearate, about 4 percent to about 10 percent zinc oleate, up to 5 percent cetyl alcohol, and about 15 percent to about 20 percent petrolatum.

* * * * *